US012800485B2

(12) United States Patent
Velte et al.

(10) Patent No.: US 12,800,485 B2
(45) Date of Patent: Nov. 17, 2026

(54) HYPER-SPECTRAL ASSESSMENT OF MULTIPLE VARIANTS OF CANNABIS

(71) Applicant: Regents of the University of Minnesota, Minneapolis, MN (US)

(72) Inventors: Toby J. Velte, Lake Elmo, MN (US); Quinton J. Krueger, Lake Elmo, MN (US); Robert J. Barnes, St. Michael, MN (US); Thomas E. Michaels, Stillwater, MN (US); Ce Yang, Arden Hills, MN (US); An Min, St. Paul, MN (US); Jaafar Jabbar Abdulridha, Forest Lake, MN (US); Colin R. Jones, Columbia Heights, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 512 days.

(21) Appl. No.: 18/178,199

(22) Filed: Mar. 3, 2023

(65) Prior Publication Data

US 2024/0295494 A1 Sep. 5, 2024

(51) Int. Cl.
*G01N 21/3563* (2014.01)
*A01C 21/00* (2006.01)
(Continued)

(52) U.S. Cl.
CPC ....... *G01N 21/3563* (2013.01); *A01C 21/007* (2013.01); *G01N 21/359* (2013.01); *G06N 3/09* (2023.01); *G01N 2201/126* (2013.01)

(58) Field of Classification Search
CPC ............. A01C 21/007; G01N 33/0098; G01N 2021/8466; G01N 21/359; G01N 21/3563;
(Continued)

(56) References Cited

U.S. PATENT DOCUMENTS

2015/0015692 A1* 1/2015 Smart .................... G01J 3/2823 348/77
2016/0044862 A1* 2/2016 Kocer ................. A01M 7/0089 111/118

(Continued)

FOREIGN PATENT DOCUMENTS

| | | | | |
|---|---|---|---|---|
| EP | 3502664 A1 * | 6/2019 | ............ | G01J 3/0289 |
| WO | WO-2024003908 A1 * | 1/2024 | ......... | G01N 21/3563 |

OTHER PUBLICATIONS

Takkar, Sakshi, et al. "Recognition of image-based plant leaf diseases using deep learning classification models." Nature Environment & Pollution Technology 20 (2021). (Year: 2021).*

(Continued)

*Primary Examiner* — Maurice C Smith

(74) *Attorney, Agent, or Firm* — Dicke, Billig & Czaja, PLLC

(57) ABSTRACT

A method of identifying NPK-deficiency includes measuring intensities of light reflected from a cannabis plant to produce intensities at a set of spectral bands, wherein the cannabis plant is one variety of a plurality of varieties of cannabis. The intensities are applied to a classifier so that the classifier provides one of an indication that the cannabis plant is NPK-deficient or an indication that the cannabis plant is NPK-sufficient, wherein the classifier has been trained using plants that include each of the plurality of varieties of cannabis.

9 Claims, 12 Drawing Sheets

(51) Int. Cl.
*G01N 21/359* (2014.01)
*G06N 3/09* (2023.01)

(58) Field of Classification Search
CPC .. G06N 3/08-0985; G06N 3/02; G06N 20/00; G06T 2207/20081
See application file for complete search history.

(56) References Cited

U.S. PATENT DOCUMENTS

2017/0131200 A1* 5/2017 Raveh .................... G01N 21/21
2021/0137028 A1* 5/2021 Zelkind .................. A01G 9/023

OTHER PUBLICATIONS

Rose Ellen N. Macabiog, "Soil NPK Levels Characterization Using Near Infrared and Artificial Neural Network", 2020 (Year: 2020).*
Yangfang Zhai, "Estimation of nitrogen, phosphorus, and potassium contents in the leaves of different plants using laboratory-based visible and near-infrared reflectance spectroscopy: comparison of partial least-square regression and support vector machine regression methods", Dec. 21, 2012 (Year: 2012).*
Nirit Bernstein, "Impact of N, P, K, and Humic Acid Supplementation on the Chemical Profile of Medical Cannabis (*Cannabis sativa* L)", Jun. 16, 2019 (Year: 2019).*
Spectra Vista Corp, "Spectral Reflectance Measurements with SVC Leaf Clip, Reflectance Probe", https://www.youtube.com/watch?v=TDFz2yYCIXM Aug. 3, 2019 (Year: 2019).*
Abdulridha et al., A remote sensing technique for detecting laurel wilt disease in avocado in presence of other biotic and abiotic stress, Computers and Electronics in Agriculture, vol. 156, 28 pages, 2019.
Ampatzidis et al., iPathology: Robotic Applications and Management of Plants and Plant Diseases, Sustainability, vol. 9, No. 6, Article 1010, 14 pages, 2017.
Atkinson et al., Neural networks in remote sensing—Introduction, International Journal of Remote Sensing, vol. 18, No. 4, pp. 699-709, 1997.
Barros et al., Combining global optimization algorithms with a simple adaptive distance for feature selection and weighting. In. IEEE International joint conferance on Neural Networks, 6 pages, 2008.
Blackburn, Quantifying chlorophylls and caroteniods at leaf and canopy scales: An evaluation of some hyperspectral approaches, Remote Sensing of Environment, vol. 66, No. 3, pp. 273-285, 1998.
Boroujerdnia et al., Effect of cultivars, harvesting time and level of nitrogen fertilizer on nitrate and nitrite content, yield in romaine lettuce, Asian Journal of Plant Sciences, vol. 6, No. 3, pp. 550-553, 2007.
Cruz et al., X-FIDO: An effective application for detection olive quick decline syndrome with deep learning and data fusion Frontiers in Plant Science, vol. 8, Article 1741, 12 pages, 2017.
De Castro et al., Detection of Laurel Wilt Disease in Avocado Using Low Altitude Aerial Imaging, Plos One, vol. 10, No. 4, Article e0124642, 13 pages, 2015.
De Castro et al., Optimum spectral and geometric parameters for early detection of laurel wilt disease in avocado, Remote Sensing of Environment, vol. 171, pp. 33-44, 2015.
Dormant ties exercise, Sloan 2024 LPO, 1 page.
Gunkel et al., Sugar cane industry as a source of water pollution—case study on the situation in Ipojuca river, Pernambuco, Brazil, Water Air and Soil Pollution, vol. 180, No. 1-4, pp. 261-269, 2007.
Haboudane et al., Hyperspectral vegetation indices and novel algorithms for predicting green LAI of crop canopies: Modeling and validation in the context of precision agriculture, Remote Sensing of Environment, vol. 90, No. 3, pp. 337-352, 2004.
Heim et al., Detecting myrtle rust (*Austropuccinia psidii*) on lemon myrtle trees using spectral signatures and machine learning, Plant Pathology, vol. 67, No. 5, pp. 1114-1121, 2018.
Loh et al., Mathematics Research Center, Technical Summary Report #2902, Tree-structured classification via generalized discriminant analysis (U), 39 pages, 1986.
Lopez-Granados, Weed detection for site-specific weed management: mapping and real-time approaches, Weed Research, vol. 51, No. 1, pp. 1-11, 2011.
Lu et al., Field detection of anthracnose crown rot in strawberry using spectroscopy technology [Article], Computers and Electronics in Agriculture, vol. 135, pp. 289-299, 2017.
Luvisi et al., Plant Pathology and Information Technology: Opportunity for Management of Disease Outbreak and Applications in Regulation Frameworks, Sustainability, vol. 8, No. 8, Article 831, 12 pages, 2016.
Mahlein et al., Recent advances in sensing plant diseases for precision crop protection, European Journal of Plant Pathology, vol. 133, No. 1, pp. 197-209, 2012.
Mahlein et al., Spectral signatures of sugar beet leaves for the detection and differentiation of diseases, Precision Agriculture, vol. 11, No. 4, pp. 413-431, 2010.
Moshou et al., Automatic detection of 'yellow rust' in wheat using reflectance measurements and neural networks, Computers and Electronics in Agriculture, vol. 44, No. 3, pp. 173-188, 2004.
Nie et al., Research on the Effects of Drying Temperature on Nitrogen Detection of Different Soil Types by Near Infrared Sensors, Sensors, vol. 18, No. 2, Article 391, 22 pages, 2018.
Omrani et al., Potential of radial basis function-based support vector regression for apple disease detection, Measurement, vol. 55, pp. 512-519, 2014.
Osborne et al., Detection of phosphorus and nitrogen deficiencies in corn using spectral radiance measurements, Agronomy Journal, vol. 94, No. 6, pp. 1215-1221, 2002.
Roujean et al., Estimating par absorbed by vegetation from bidirectional reflectance measurements, Remote Sensing of Environment, vol. 51, No. 3, pp. 375-384, 1995.
Rumelhart et al., Parallel Distributed-Processing—Explorations in the Microstructure of Cognition, vol. 1, Contemporary Psychology, vol. 32, No. 11, pp. 925-928, 1987.
Sankaran et al., Detection of huanglongbing disease in citrus using fluorescence spectroscopy. Transactions of the ASABE, vol. 55, No. 1, pp. 313-320, 2012.
Sims et al., Relationships between leaf pigment content and spectral reflectance across a wide range of species, leaf structures and developmental stages, Remote Sensing of Environment, vol. 81, No. 2-3, pp. 337-354, Article Pii s0034-4257(02)00010-x, 2002.
Singh et al., Application of image processing and radial basis neural network techniques for ore sorting and ore classification. Minerals Engineering, vol. 18, No. 15, pp. 1412-1420, 2005.
Strachan et al., Impact of nitrogen and environmental conditions on corn as detected by hyperspectral reflectance, Remote Sensing of Environment, vol. 80, No. 2, pp. 213-224, Article Pii s0034-4257(01)00299-1, 2002.
Tilling et al., Remote sensing of nitrogen and water stress in wheat, Field Crops Research, vol. 104, No. 1-3, pp. 77-85, 2007.
Yong et al., Progress in application of near infrared spectroscopy technology in agriculture, Transactions of the CSAE, vol. 23, No. 10, pp. 285-290 (in Chinese with English abstract), 2007.

* cited by examiner

HYPER-SPECTRAL ASSESSMENT OF MULTIPLE VARIANTS OF CANNABIS

BACKGROUND

Nutritional deficiencies in plants reduce the yield of grow operations by limiting the growth of the plants or in worst cases, killing the plants. In particular, the inability of plants to receive enough nitrogen (N), phosphorus (P) or potassium (K) affects the yield of grow operations. At the same time, in order to be efficient and ecologically sound, grow operations do not want to add excess amounts of Nitrogen, Phosphorous or Potassium to the plant bed.

The discussion above is merely provided for general background information and is not intended to be used as an aid in determining the scope of the claimed subject matter. The claimed subject matter is not limited to implementations that solve any or all disadvantages noted in the background.

SUMMARY

A method of identifying NPK-deficiency includes measuring intensities of light reflected from a cannabis plant to produce intensities at a set of spectral bands, wherein the cannabis plant is one variety of a plurality of varieties of cannabis. The intensities are applied to a classifier so that the classifier provides one of an indication that the cannabis plant is NPK-deficient or an indication that the cannabis plant is NPK-sufficient, wherein the classifier has been trained using plants that include each of the plurality of varieties of cannabis.

In accordance with a further embodiment, a method includes placing a light sensor within a meter of a top of a plant and measuring intensities of each of a set of spectral bands of light reflected by the plant using the light sensor. The intensities are then used to classify the plant as NPK-deficient.

In accordance with a still further embodiment, a system includes a sensing system having a light sensor and a positioning system, wherein the light sensor measures intensities for light reflected from at least one cannabis plant at a plurality of spectral bands and the positioning system provides a position of the sensing system when the light sensor measured the intensities. A classifier receives the intensities and the position and provides a classification for the at least one cannabis plant at the position, wherein the classification indicates whether the at least one cannabis plant is NPK-deficient and the classification is based on the received intensities.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Early detection of nitrogen (N), phosphorus (P), and potassium (K) deficiencies (collectively NPK deficiencies) is important in maximizing yield of the plant. However, some plants, such as cannabis, appear green and healthy during early stages of growth even though they are not receiving enough NPK. As a result, growers have had to wait for the plants to show visible signs of NPK deficiency before being able to take action to correct the deficiencies.

The present inventors have discovered that NPK-deficient cannabis plants exhibit a change in the amount of light they reflect at near infrared wavelengths. This change occurs before the cannabis plants have any visible indications to a human grower of NPK-deficiency. The embodiments discussed below provide a system that uses the intensity of light reflected from cannabis plants at a collection of wavelengths, including near infrared wavelengths, to categorize cannabis plants as either being NPK-deficient or NPK-sufficient. Because the embodiments use near infrared wavelengths, NPK deficiencies are detected earlier than the prior art. The system can be used with multiple different varieties of cannabis plants even though NPK deficiencies cause different changes in light reflectance in different varieties of cannabis.

In accordance with one embodiment, the detection of the reflected light intensity is improved by placing the light sensors within a meter of the cannabis plant.

Figure 1:
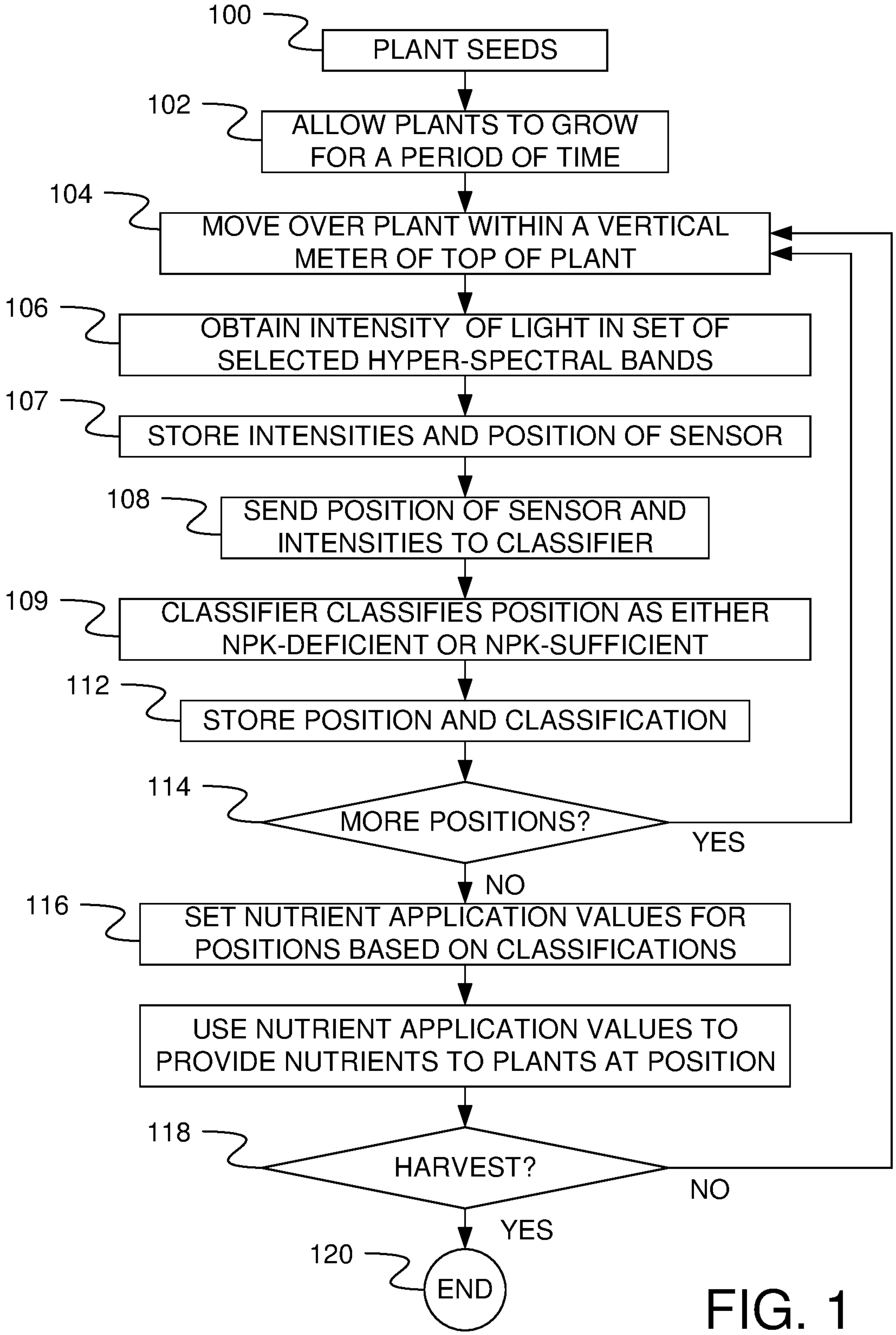
FIG. 1 is a flow diagram of a method of classifying cannabis plants for nutrient applications.
Figure 2:
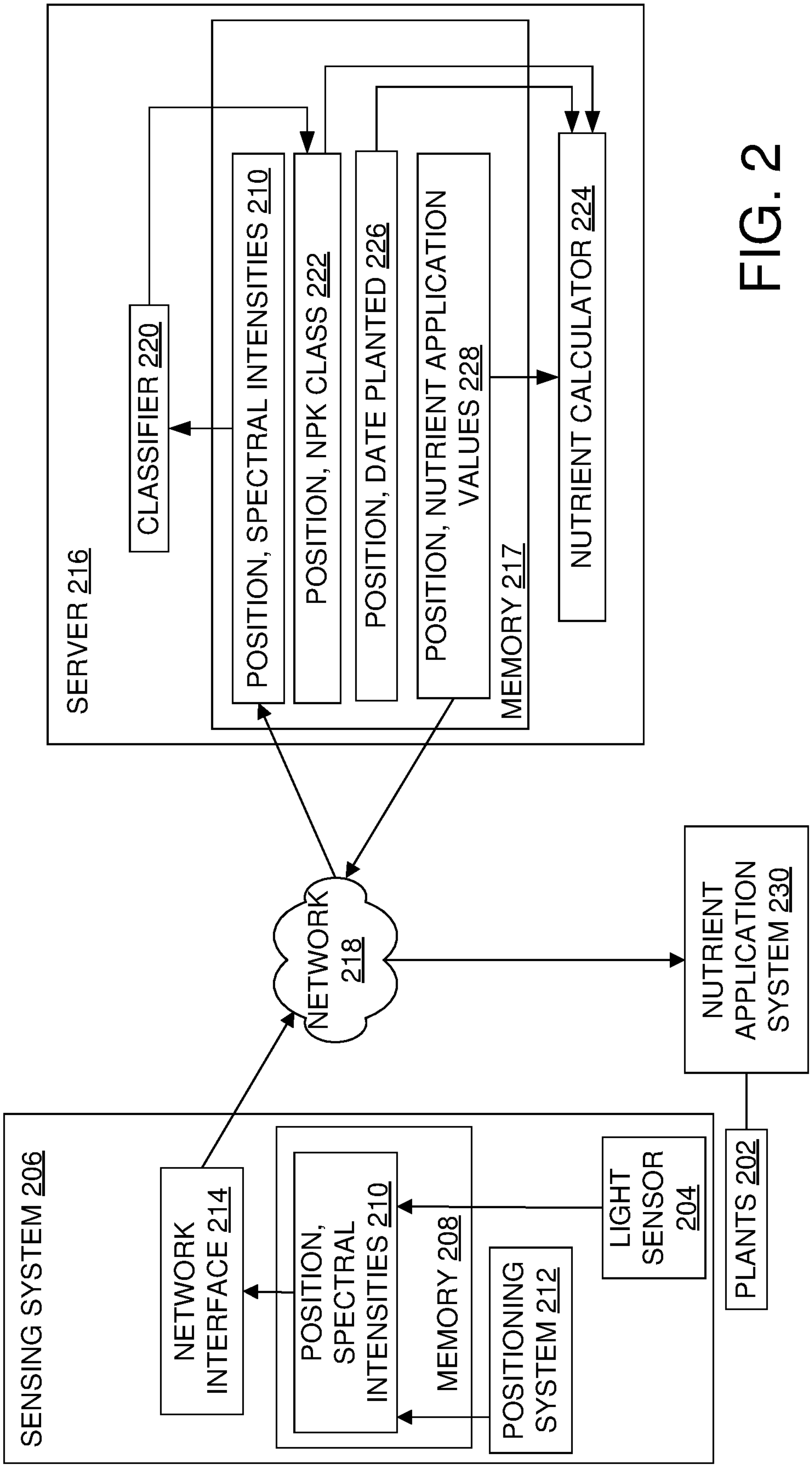
FIG. 2 is a block diagram of a system for classifying cannabis plants and applying nutrients.

FIG. 1 provides a flow diagram of a method of identifying cannabis plants that are NPK-deficient and applying nutrients to correct the deficiencies. FIG. 2 provides a block diagram of a system 200 used to perform the method of FIG. 1.

In step 100 of FIG. 1, cannabis seeds are planted in soil or another growing medium. The grower then allows the seeds to grow for a period of time at step 102 so that the seeds become plants 202 with large enough surface areas to reflect sufficient light for classification. In accordance with one embodiment, the period of time in step 102 is fifteen days.

At step 104, a hyper-spectral light sensor 204 in a sensing system 206 is moved to a position over plants 202. In accordance with one embodiment, sensor 204 is positioned within a meter of the top of plants 202. At step 106, sensor 204 obtains intensity levels of light reflected by plants 202 at a set of selected hyper-spectral bands. In accordance with one embodiment, the set of hyper-spectral bands include 2.1 nm wide bands centered at 725.57, 732.05, 992.83, 854.39, 792.9, and 712.62 nm, which are all in the near infrared range (700 nm-1400 nm). In one such embodiment, these hyper-spectral bands are used for multiple varieties of cannabis plants, even though the varieties have different morphologies. This provides a single system that can work with multiple different varieties of cannabis, thereby reducing the number of systems needed to implement the present embodiments.

At step 107, a current position of light sensor 204 and the intensities of the reflected light are stored in a memory 208 of sensing system 206 as position and spectral intensities 210. The current position is provided by a positioning system 212 in sensing system 206. In accordance with one embodiment, positioning system 212 comprises a motor controller that is able to determine the position of light sensor 204 based on the number of rotations of a drive motor that moves light sensor 204 over the plants. In other embodiments, positioning system 212 comprises a Global Positioning System (GPS) that provides the position of light sensor 204 using signals received from satellites. Position and spectral intensities 210 include a separate light intensity for each hyper-spectral band in the set of hyper-spectral bands obtained by light sensor 204.

At step 108, position and spectral intensities 210 are transmitted by a network interface 214 of sensing system 206 to a server 216 through a network 218. In accordance with one embodiment, network 218 includes a wide-area network such as the Internet. Position and spectral intensities 210 are stored in a memory 217 in server 216 and are provided to a classifier 220 executed by server 216.

At step 109, classifier 220 uses the spectral intensities in position and spectral intensities 210 to classify the position as either NPK-deficient or NPK-sufficient.

In accordance with one embodiment, classifier 220 is a Neural Network Multilayer Perceptron (MLP). MLP is an artificial neural network that is trained using supervised machine learning. It is a more complicated process than a simple linear classifier and can analyze a substantial amount of data. In other embodiments, classifier 220 is a Stepwise Discriminant Analysis (STDA), a Quadratic Discriminant Analysis, or a random forest classifier. Those skilled in the art will recognize that these are examples of possible classifiers and other classifiers may be used as classifier 220. In accordance with one embodiment, classifier 220 is trained using light intensities measured from a plurality of different varieties of cannabis plants. As a result, classifier 220 is able to classify multiple different varieties of cannabis as being either NPK-deficient or NPK-sufficient.

At step 112, the class provided by classifier 220 is stored with the position as position and NPK class 222.

At step 114, sensing system 206 determines if there are more plant positions to be evaluated. If there are more plant positions, sensing system 206 moves to a different position and steps 104-112 are repeated for the new position.

When sensing system 206 has collected spectral intensities at all desired plant positions and classifier 220 has produced an NPK class for each position at step 114, nutrient application values are set for each position at step 116. In particular, a nutrient calculator 224 uses the NPK class 222 and a date of planting 226 for the position to calculate an amount of nutrients that should be applied to the position. If the NPK class is NPK-sufficient, the nutrient application value is set to a minimum value, which in many cases will be zero. If the NPK class is NPK-deficient, the nutrient application value is set so as to overcome the NPK deficiency while ensuring that an excessive amount of nutrients is not applied to the position. Human growers are alerted to conditions that require intervention or changes to nutrient applications. In particular, date of planting 226 is used to estimate the date of harvest and the nutrient value is selected so that the plant has sufficient NPK to reach the harvest date but there is a minimum amount of NPK left at the position after the harvest date. The nutrient application value is stored with the position as an entry 228 in memory 217.

At step 118, the nutrient application values for each position are provided to a nutrient application system 230 through network 218 or some other network. In accordance with one embodiment, nutrient application system 230 is a nutrient feed line that is able to provide different amounts of nutrients to different positions in a grow operation. In other embodiments, nutrient application system 230 is a movable fertilization system equipped with a positioning system that is able to determine when the fertilization system is at a desired position and is able to apply a desired amount of nutrients at that position. Nutrient application system 230 uses the nutrient application values to provide the appropriate amount of nutrients to each position at some point during a multi-day period, such as four days for example. In accordance with one embodiment, the nutrients are provided as soon as possible during the multi-day period. In other embodiments, the nutrients are provided over the course of the multi-day period.

At the end of the multi-day period, sensing system 206 or server 216 determines if the harvest date has been reached for all plants in the grow operation at step 120. If at least one plant has not been harvested, the method returns to step 104 and steps 104-120 are repeated. Thus, at the end of each multi-day period, the plants are reclassified. This allows plants that had been classified as NPK-sufficient to be reclassified as NPK-deficient if the amount of NPK provided to the plants is no longer sufficient. In addition, it allows plants that were classified as NPK-deficient to be reclassified as NPK-sufficient if the nutrients applied in step 118 were effective in overcoming the NPK deficiency. By reclassifying the plants, the amount of nutrients applied to the plants can be minimized while ensuring that the plants are receiving enough NPK.

When all of the plants have been harvested, the method of FIG. 1 ends at step 122.

Figure 3:
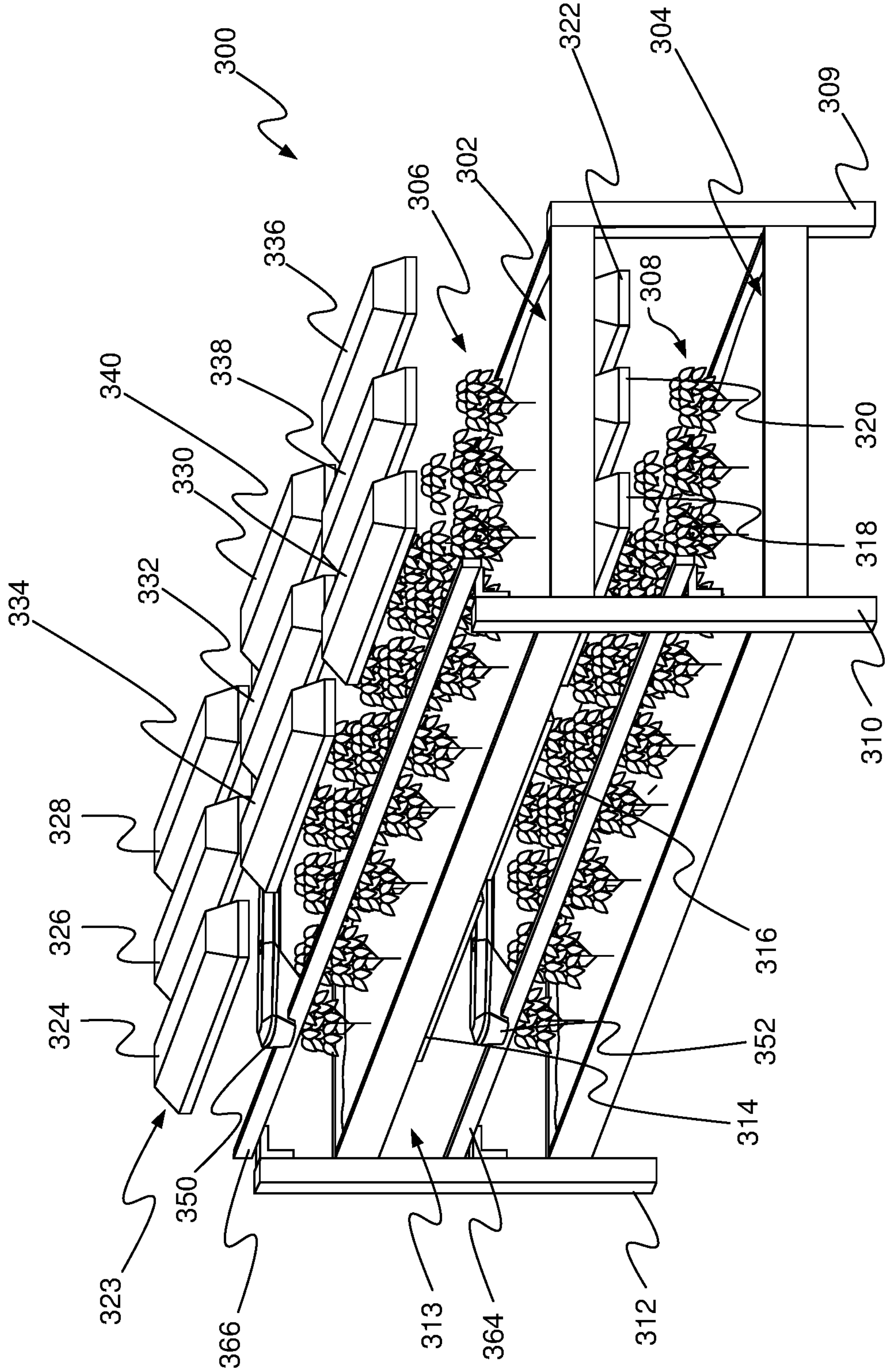
FIG. 3 is perspective view of an indoor grow operation.
Figure 4:
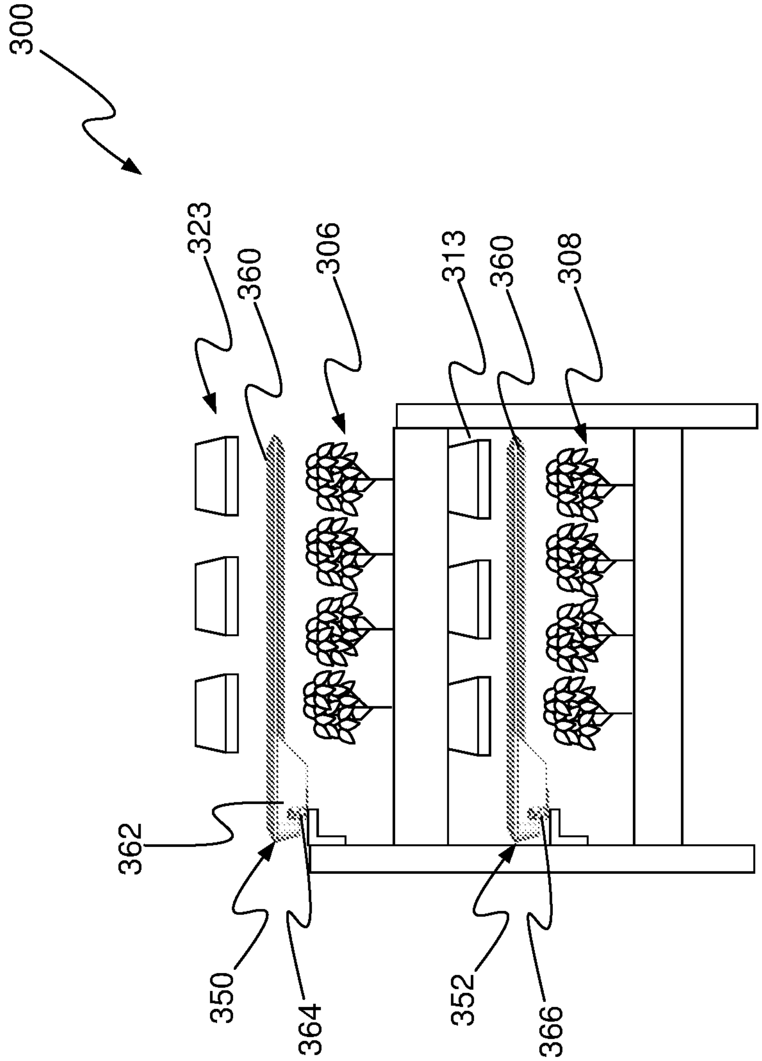
FIG. 4 is an end view of the indoor grow operation of FIG. 3.

FIG. 3 provides a perspective view of a grow operation 300 that provides one example of an environment in which various embodiments may be practiced. FIG. 4 provides a side view of grow operation 300. Grow operation 300 includes two vertically stacked plant beds 302 and 304 that each support a plurality of plants 306 and 308. Plant beds 302 and 304 are supported on a plurality of posts such as posts 309, 310, and 312. Plant beds 302 and 304 include a watering and feeding system, not shown for simplicity. A collection of light sources 313 that includes light sources 314, 316, 318, 320, and 322 are supported on the bottom of plant bed 302. A second collection of light sources 323 that includes light sources 324, 326, 328, 330, 332, 334, 336, 338, and 340 are supported by a separate structure (not shown), which typically consists of a ceiling structure of a building in which grow operation 300 is housed. Grow operation 300 also includes two sensing systems 350 and 352, which are also referred to as movable sensor platforms and self-propelled sensing systems. Each sensing system includes a boom, such as boom 360 and a motor housing, such as motor housing 362. Boom 360 includes a collection of sensor pods discussed further below. Motor housing 362 includes a battery, an integrated circuit board, a motor, and a support interface that support the sensing system on a rail, such as rails 364 and 366.

As shown in FIG. 4, boom 360 of sensing system 350 extends between collection of light sources 323 and plants 306 and boom 360 of sensing system 352 extends between collection of light sources 313 and plants 308. In accordance with one embodiment, boom 360 of sensing systems 350 and 352 is positioned within a meter of the top of the respective plants 306 and 308. This allows the sensors in booms 360 to measure conditions close to the plants in each plant bed.

Figure 5:
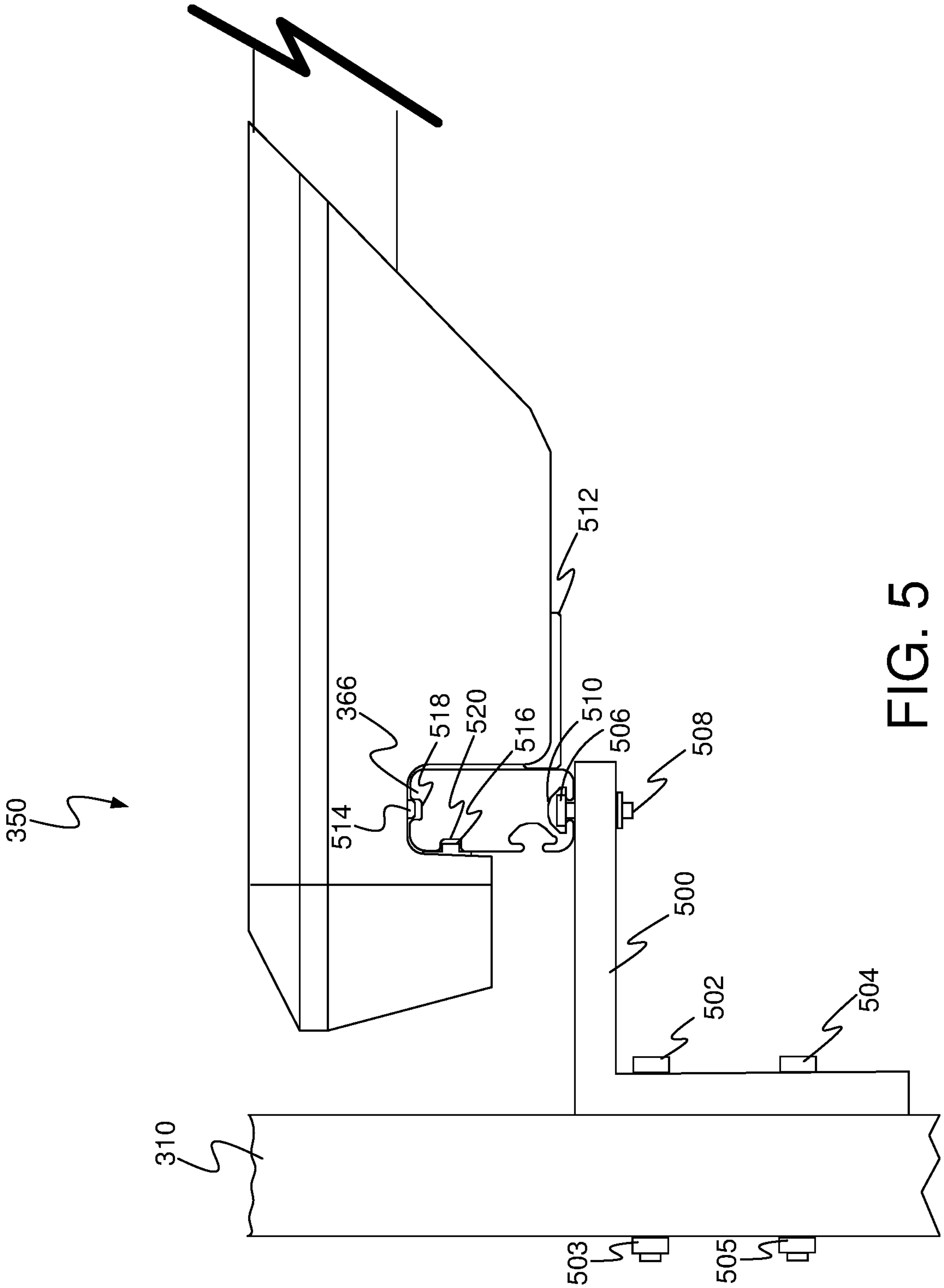
FIG. 5 is an enlarged end view of a portion of the indoor grow operation.

FIG. 5 shows an enlarged side view of motor housing 360, rail 366, and post 310. As shown in FIG. 5, rail 366 is mounted to an L-bracket 500 that in turn is mounted to post 310 using bolt 502 and 504. Rail 366 is mounted to L-bracket 500 using a bolt 506 and a nut 508 with the head bolt 506 placed in a channel 510 of rail 366. In other embodiments, L-bracket 500 is mounted to post 310 using a U-shaped bar that passes around post 310 and through L-bracket 500. Two nuts are then applied to the ends of the U-shaped bar to tighten L-bracket 500 against post 310.

In FIG. 5, the support interface of sensing system 350 is seen to include a drive wheel 512, a top guide 514, and a guide wheel 516. Drive wheel 512 is connected to a motor discussed further below and rotates against rail 366 in order to move sensing system 350 along rail 366. Top guide 514 and guide wheel 516 extend into grooves 518 and 520 in rail 366 and thereby support sensing system 350 on rail 366 such that boom 360 is cantilevered from rail 366. As a result, sensing systems 350 and 352 are only supported on one side allowing for easier installation, lower cost, and easier access to the plants in the plant bed from the side of the plant bed without the rail.

As shown in FIGS. 3-5, sensing system 350 is a moveable sensor platform, configured to be supported exclusively by rail 366 and to move along rail 366. In other words, sensing system 350 is does not require a connection to any element other than rail 366.

As shown in FIGS. 3-5, sensing systems 350 and 352 are supported on the same structure that supports the plant beds. In particular, posts 309, 310, and 322, support beds 302 and 304, and rails 366 and 364, which in turn support sensing systems 350 and 352. By using the same structure to support the plant beds and the support sensing systems, the embodiments create a compact structure for the grow operation thereby improving access to the plants in the plant bed and limiting the amount of square feet taken up by the sensing system. In other embodiments, the rails are supported on posts that are separate from the structure that supports the plant beds.

As sensing systems 350, 352 move along their respective rails, they are positioned over different plants in their respective plant beds and under different sets of lights that are positioned over their plant beds. Since the sensing system is self-propelled, it controls its movement over the plants allowing it to control the linear density of sensor values collected over the plants. In addition, because the sensing system is able to move relative to the plants, when sensing is not being performed, the sensing system can move to a position where it is not between the lights and any particular plant. This ensures that each plant receives as much light as possible when sensing is not taking place.

Figure 7:
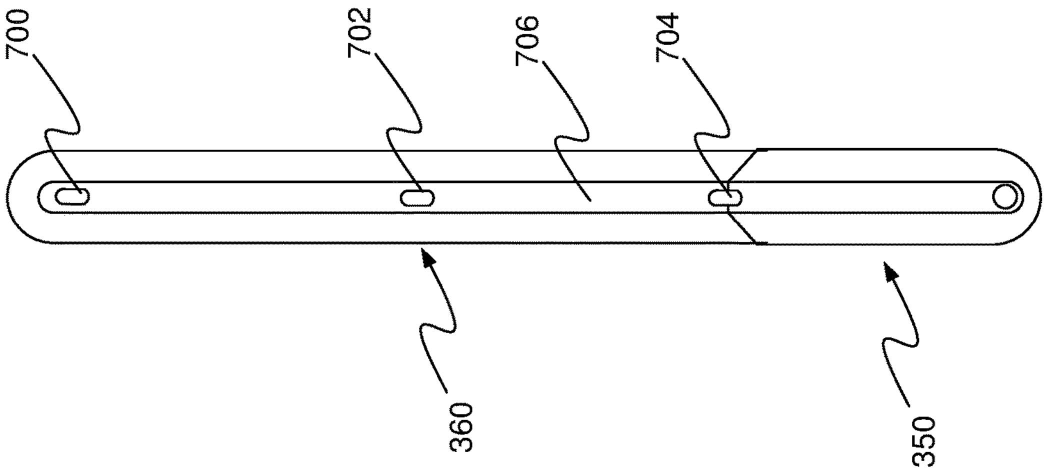
FIG. 7 is a top view of the sensing system of FIG. 6.
Figure 6:
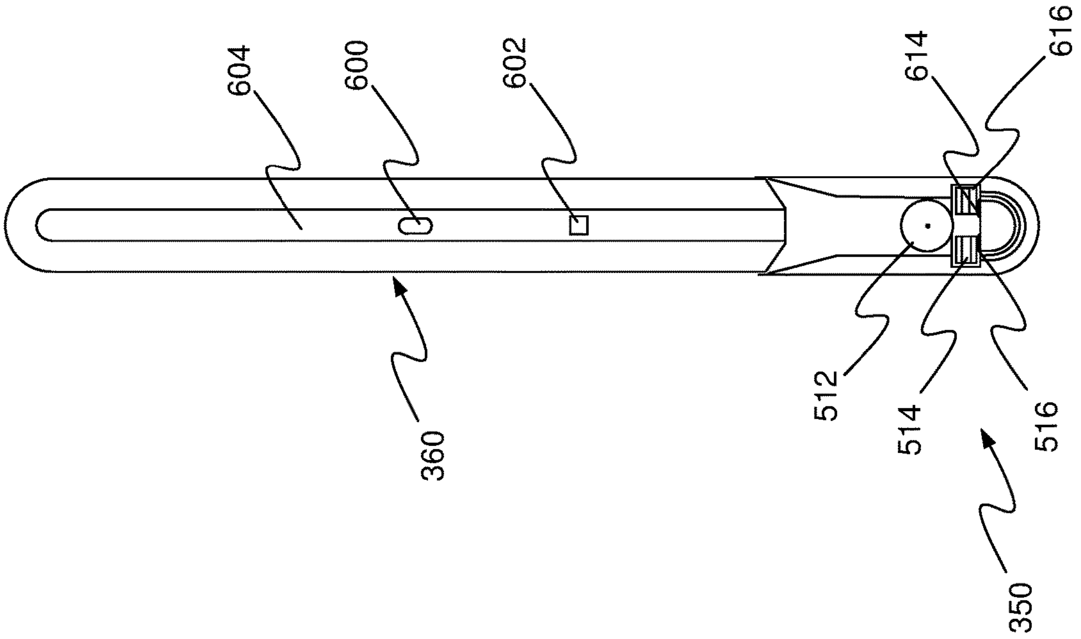
FIG. 6 is bottom view of a sensing system in accordance with one embodiment.
Figure 8:
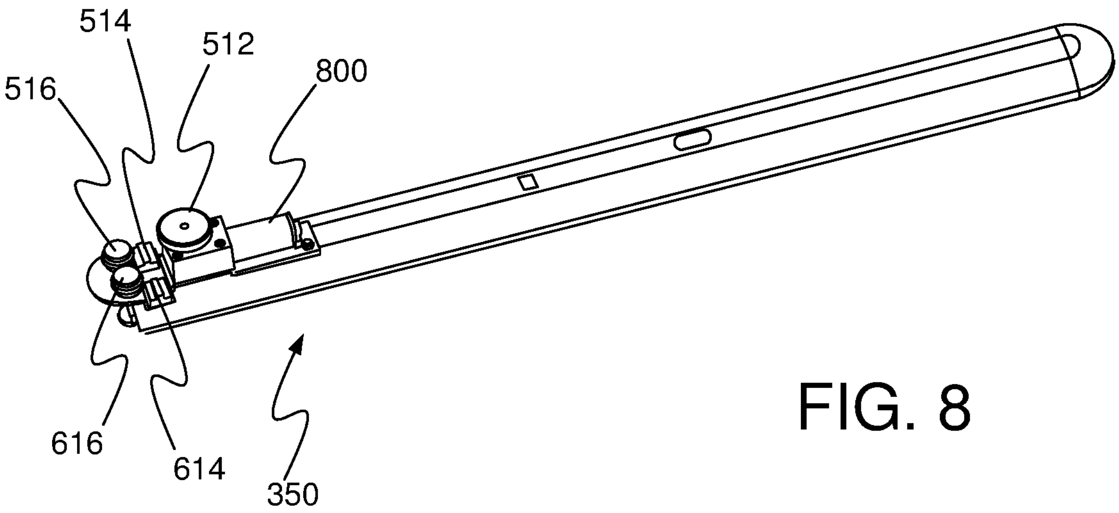
FIG. 8 is a bottom perspective view of the sensing system of FIG. 6 with a casing for the motor housing removed.
Figure 9:
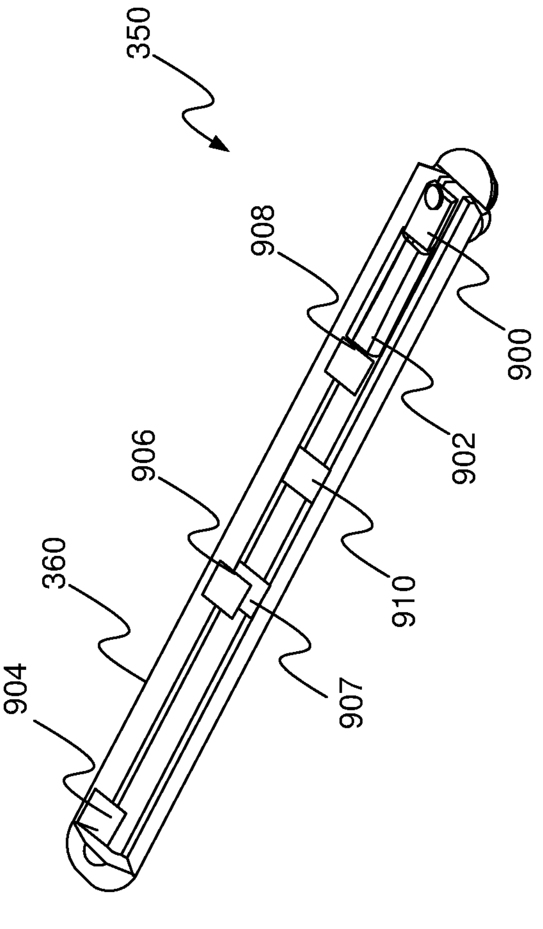
FIG. 9 is a top perspective view of the sensing system of FIG. 6 with an upper casing along the boom removed and an outer casing of the motor housing removed.

FIG. 6 provides a bottom view of sensing system 350. FIG. 7 provides a top view of sensing system 350. FIG. 8 provides a bottom perspective view of sensing system 350 with a casing for the motor housing removed and FIG. 9 provides a top perspective view of sensing system 350 with an upper casing along boom 360 removed and an outer casing of housing 362 removed. Although sensing system 350 is shown in FIGS. 6-9, sensing system 352 is identical to sensing system 350.

As shown in FIGS. 6 and 8, the support interface includes not only drive wheel 512, top guide 514 and guide wheel 516 but also a second top guide 614 and a second guide wheel 616. Top guides 514 and 614 each include a tongue that extends into groove 518 of rail 366. Top guides 514 and 614 also include two downward facing surfaces, one on each side of the tongue, designed to rest on and slide along the top of rail 366.

Guide wheels 516 and 616 include a central portion that extends into groove 520 of rail 366 and two side portions above and below the central portion that engage with a side of rail 366. Guide wheels 516 and 616 are free to spin along their respective central axis and in accordance with one embodiment are not driven by a motor.

Drive wheel 512 is driven by an electric motor 800 shown in FIG. 8. In accordance with one embodiment, motor 800 is an encoded worm drive motor that provides accurate control of the amount of rotation of drive wheel 512. In such motors, magnetic encoders on the shaft of the motor provide an indication of the number of degrees the motor has rotated. This makes it possible to determine how many degrees drive wheel 512 has rotated and to thereby determine the linear movement of sensing system 350 along the rail. Thus, in this embodiment, electric motor 800 acts as part of positioning system 212 of FIG. 2 by providing the position of sensing system 350 along the rail. This in combination with an identifier for the plant bed that sensing system 350 is positioned over provides complete position information for the light sensors within sensing system 350.

As shown in FIG. 6, a bottom casing 604 of boom 360 includes to apertures 600 and 602 and as shown in FIG. 7, an upper casing 706 of boom 360 includes three apertures 700, 702, and 704.

As shown in FIG. 9, sensing system 350 also includes an integrated circuit board 900 and an internal battery 902. Integrated circuit board 900 includes electrical components used to control movement of sensing system 350, to collect sensor data and images using sensors and cameras in boom 360, to determine when and how long to charge the internal battery 902, and to transmit the collected sensor data and images to an external server through a wireless connection. Battery 902 provides electrical power to the components of integrated circuit board 900 as well as motor 800 used to move sensing system 350.

Figure 10:
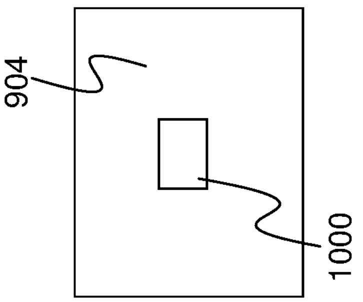
FIG. 10 is a top plan view of a sensor pod.
Figure 11:
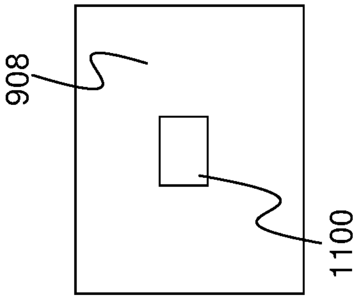
FIG. 11 is a top plan view of a second sensor pod.
Figure 12:
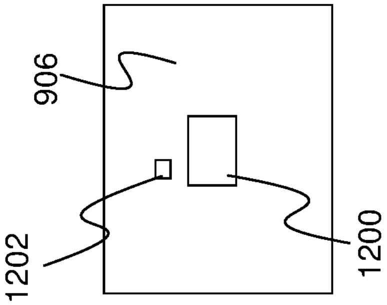
FIG. 12 is a top plan view of third sensor pod.

As shown in FIG. 9, boom 360 contains five sensor pods 904, 906, 907, 908, and 910. FIG. 10 shows a top plan view of sensor pod 904, FIG. 11 shows a top plan view of sensor pod 908, and FIG. 12 shows a top plan view of sensor pod 906. In FIGS. 10, 11, and 12, sensor pods 904, 908, and 906 are shown to contain respective upward facing multispectral light sensors 1000, 1100, and 1200. In accordance with one embodiment, light sensors 1000, 1100, and 1200 are identical to each other and each is capable of measuring the intensity of various bands of light including bands in the visible spectrum, the ultraviolet spectrum, and the infrared spectrum. Specifically, light sensors 1000, 1100 and 1200 are each able to measure light intensities in bands centered at 725.57, 732.05, 992.83, 854.39, 792.9, and 712.62 nm. In FIG. 12, sensor pod 906 is shown to also include a deep ultraviolet sensor 1202 that senses light in a deep ultraviolet bandwidth.

Figure 13:
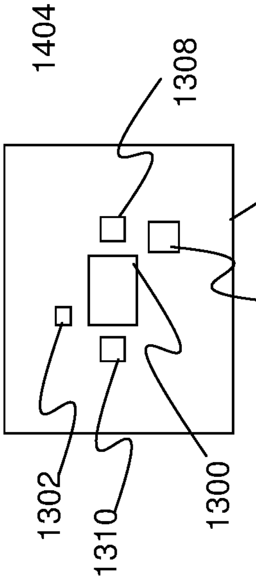
FIG. 13 is a bottom plan view of the sensor pod of FIG. 12.

FIG. 13 shows a bottom plan view of sensor pod 907, which contains a downward facing light sensor 1300 that is identical to upward facing light sensor 1200 on the top of sensor pod 906 but faces downward instead of upward. Thus, light sensor 1300 is also capable of measuring light intensities in the infrared region including in spectral bands centered at 725.57, 732.05, 992.83, 854.39, 792.9, and 712.62 nm. Sensor pod 907 also contains a deep ultraviolet sensor 1302 that is identical to deep ultraviolet sensor 1202, a range finder 1308 that measures the distance between sensor pod 907 and the top of the plant canopy directly below boom 360, and a camera 1306 that is able to capture an image of the plants below boom 360.

Figure 14:
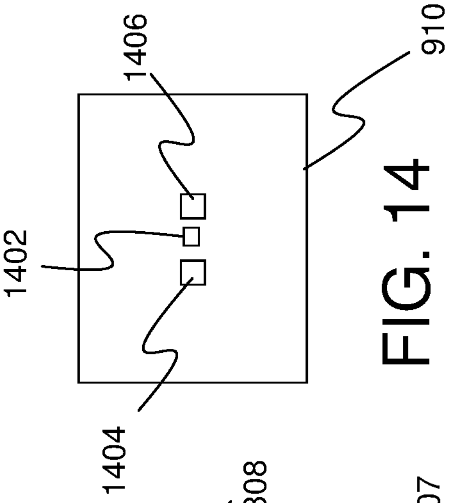
FIG. 14 is a bottom plan view of a fourth sensor pod.

FIG. 14 is a bottom plan view of sensor pod 910 and shows that sensor pod 910 includes a $CO_2$ sensor 1402 that measure carbon dioxide, a humidity sensor 1404 that measures the relative humidity in the space immediately adjacent to boom 360, and a temperature sensor 1406 that measures the temperature of the space immediately adjacent to boom 360.

Figure 15:
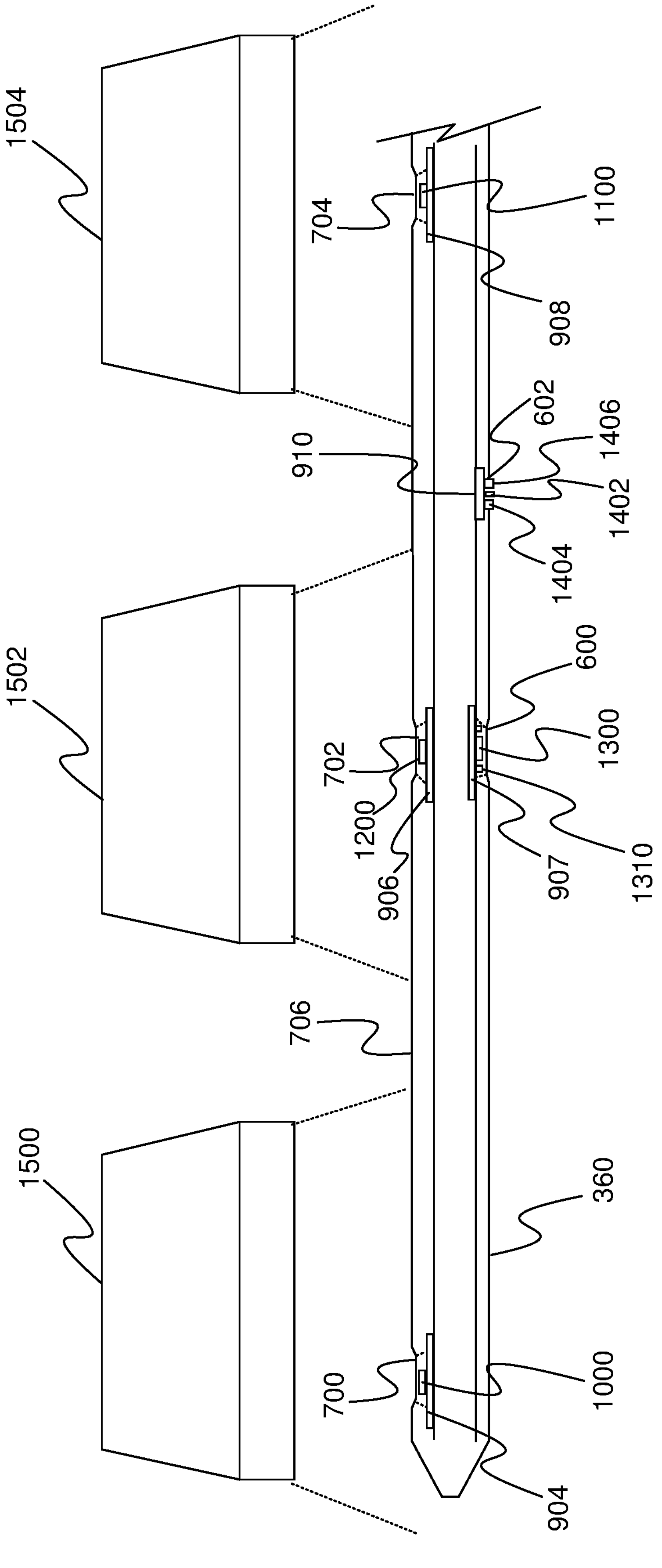
FIG. 15 is a cutaway view of a boom beneath three light sources.

FIG. 15 shows a cutaway view of boom 360 beneath three light sources 1500, 1502, and 1504. As shown in FIG. 15, apertures 700, 702, and 704 in boom case 706 allow light from light sources 1500, 1502, and 1504 to reach light sensors 1000, 1100, and 1200 on sensor pods 904, 908, and 906 as well as deep ultraviolet sensor 1202 on sensor pod 906. In particular, light from light source 1500 is received by light sensor 1000 on sensor pod 904, light from light source 1502 is received by light sensor 1200 on sensor pod 906 and light from light source 1504 is received by light sensor 1100 on sensor pod 908. Each aperture is protected by a clear lens that passes all ultraviolet, visible, and infrared light. As a result, each light sensor 1000, 1100, and 1200 provides information about the amount of light provided by a respective light source. This allows sensing system 350 to detect when a particular light source is not providing optimal lighting for plant growth. For example, if light source 1502 were providing less than a desired amount of light in a particular frequency band, the light received at sensor 1000 of sensor pod 906 would be less than the light received at light sensors 1100 and 1200. This would allow an operator to determine that light source 1502 needs to be repaired or replaced. Note that the deficiency in a light source may not be apparent to a person since the deficiency may be at a frequency band that cannot be detected by the human eye.

As shown in FIG. 15, aperture 600 in the lower casing of boom 360 allows light reflected from the plants to reach downward facing light sensor 1300 and downward facing deep ultraviolet sensor 1302. The intensity of the reflected light measured by downward facing light sensor 1300 in combination with the intensity of the light detected by upward facing light sensors 1000, 1100, and 1200 provides a means to detect what light is being absorbed by the plants. In particular, for each bandwidth of light of interest, a difference in intensity can be determined between the light that is received by light sensors 1000, 1100, and 1200 and the reflected light that is received by light sensor 1300. Similarly, a difference in the intensity of deep ultraviolet light sensed by upward facing deep ultraviolet sensor 1202 and the intensity of deep ultraviolet light sensed by downward facing deep ultraviolet sensor 1302 can be determined. The differences can then be compared to each other. Bandwidths with larger differences are considered to have been absorbed by the plant more than bandwidths with smaller differences.

Infrared light emitted by the plants is also received by infrared sensor 1310 through aperture 600. The received infrared light can be used to estimate the temperature of the plants which in turn can be used to determine Vapor Pressure Deficiency, an important growing metric.

As shown in FIG. 15, $CO_2$ sensor 1402, humidity sensor 1404, and temperature sensor 1406 extend out of an opening 602 in boom 360 so that these sensors are able to measure the $CO_2$ level, humidity level, and temperature outside of boom 360 at the current position of boom 360. In accordance with one embodiment, a seal is provided between pod 910 and the portion of boom 360 around opening 602 so as to limit the amount of external air and moisture that reaches the interior of boom 360.

Together, circuit board 900, motor 800, and drive wheel 512 form a movement subsystem configured to move the sensors and camera in boom 360 between the plants and the light sources.

Figure 16:
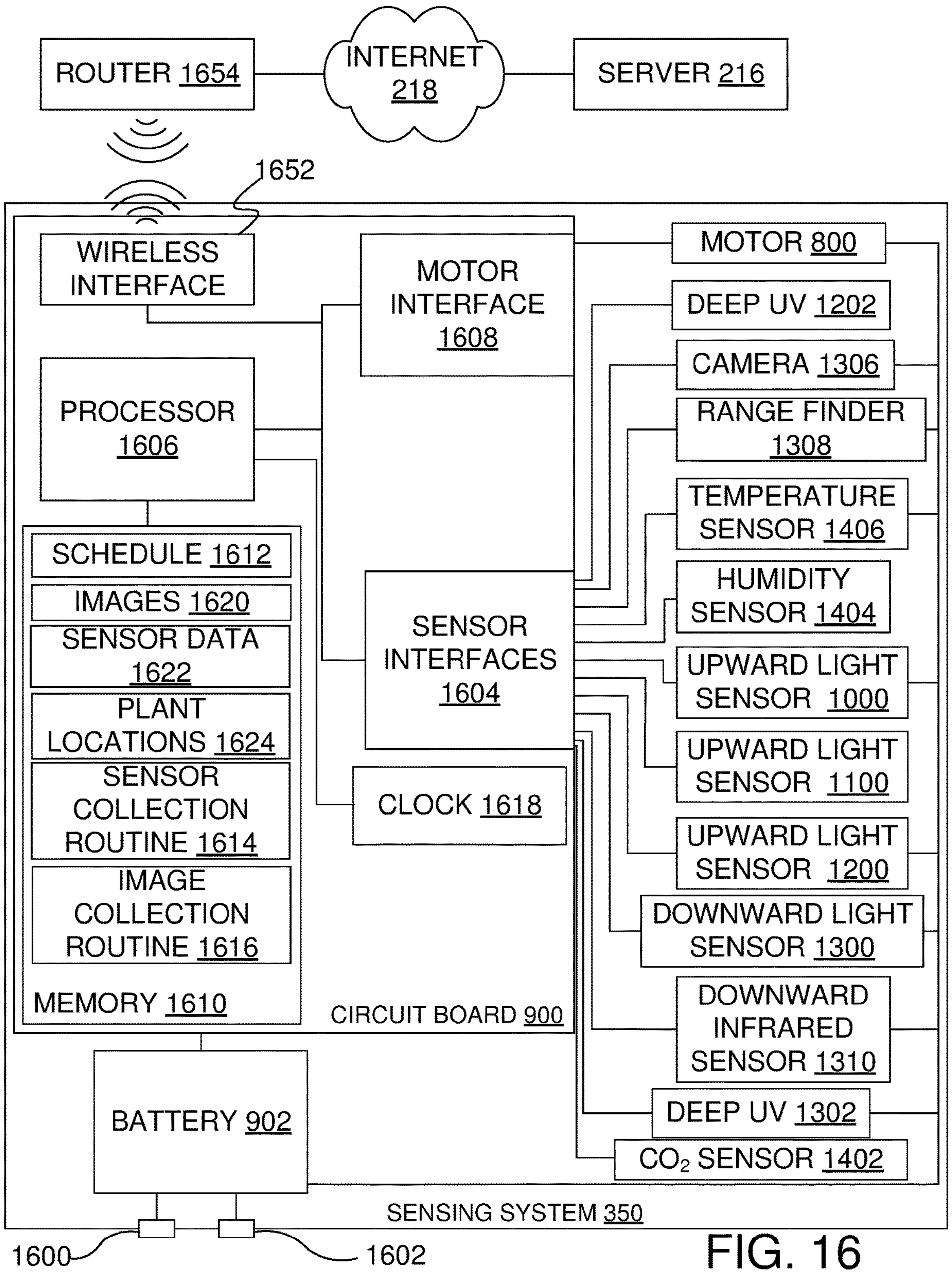
FIG. 16 is a block diagram of electronics in a sensing system.

FIG. 16 provides a circuit diagram of the electrical components in sensing system 350. As shown in FIG. 16, battery 902 provides power to circuit board 900 and each of motor 800, camera 1306, range finder 1308, temperature sensor 1406, humidity sensor 1404, upward facing light sensors 1000, 1100, and 1200, upward facing deep ultraviolet sensor 1202, downward facing light sensor 1300, downward facing infrared sensor 1310, downward facing deep ultraviolet sensor 1302, and $CO_2$ sensor 1402. Battery 902 includes two external contacts 1600 and 1602 that are used to recharge battery 902 when sensing system 350 has positioned itself at a docking station. Circuit board 900 includes a collection of sensor interfaces 1604 that are connected to camera 1306, range finder 1308, temperature sensor 1406, humidity sensor 1404, upward facing light sensors 1000, 1100, 1200, upward facing deep ultraviolet sensor 1202, downward facing light sensor 1300, downward facing infrared sensor 1310, downward facing deep ultraviolet sensor 1302, and $CO_2$ sensor 1402. Sensor interfaces 1604 receive data from the sensors and cameras and provide that data to a processor 1606. Processor 1606 is further connected to a motor interface 1608, which is further connected to motor 800. Motor interface 1608 receives instructions from processor 1606 to actuate motor 800 and based on the instructions applies current pulses to motor 800 so as turn motor 800 a desired number of degrees.

Processor 1606 is also connected to a memory 1610 which contains a schedule 1612, a sensor collection routine 1614 and an image collection routine 1616. Schedule 1612 indicates when sensor collection routine 1614 should be executed and when image collection routine 1616 should be executed. Processor 1606 uses a time provided by a clock 1618 and scheduled times provided by schedule 1612 to determine when to execute sensor collection routine 1614 and image collection routine 1616.

Memory 1610 also includes images 1620 collected by camera 1306 and sensor data 1622 collected by range finder 1308, temperature sensor 1406, humidity sensor 1404, upward facing light sensors 1000, 1100, 1200, upward facing deep ultraviolet sensor 1202, downward facing light sensor 1300, downward facing infrared sensor 1310, downward facing deep ultraviolet sensor 1302, and $CO_2$ sensor 1402 at different locations. In accordance with one embodiment, as images and sensor data are received from sensor interfaces 1604 they are stored in memory 1610 together with identifying information such as the time and date at which the images/sensor data were received and the position of the boom along the rail when the sensor data/images were received.

In accordance with one embodiment, memory 1610 also includes a collection of plant locations 1624 that indicate the position of plants within the plant bed. Plant locations 1624 may be entered by hand or may be determined from images collected by camera 1506.

Processor 1606 is in wireless communication with server 216 through a wireless interface 1652 and a router 1654, which form network interface 214 of FIG. 2. In particular, wireless interface 1652 communicates wirelessly with router 1654, which routes data packets provided by processor 1606 to server 216 through the internet 218. Using this communication link, processor 1606 is able to forward images 1620 and sensor data 1622 to server 216 and is able to receive instructions from server 216 including changes to sensor collection routine 1614 and changes to image collection routine 1616 as well as changes to schedule 1612.

Figure 17:
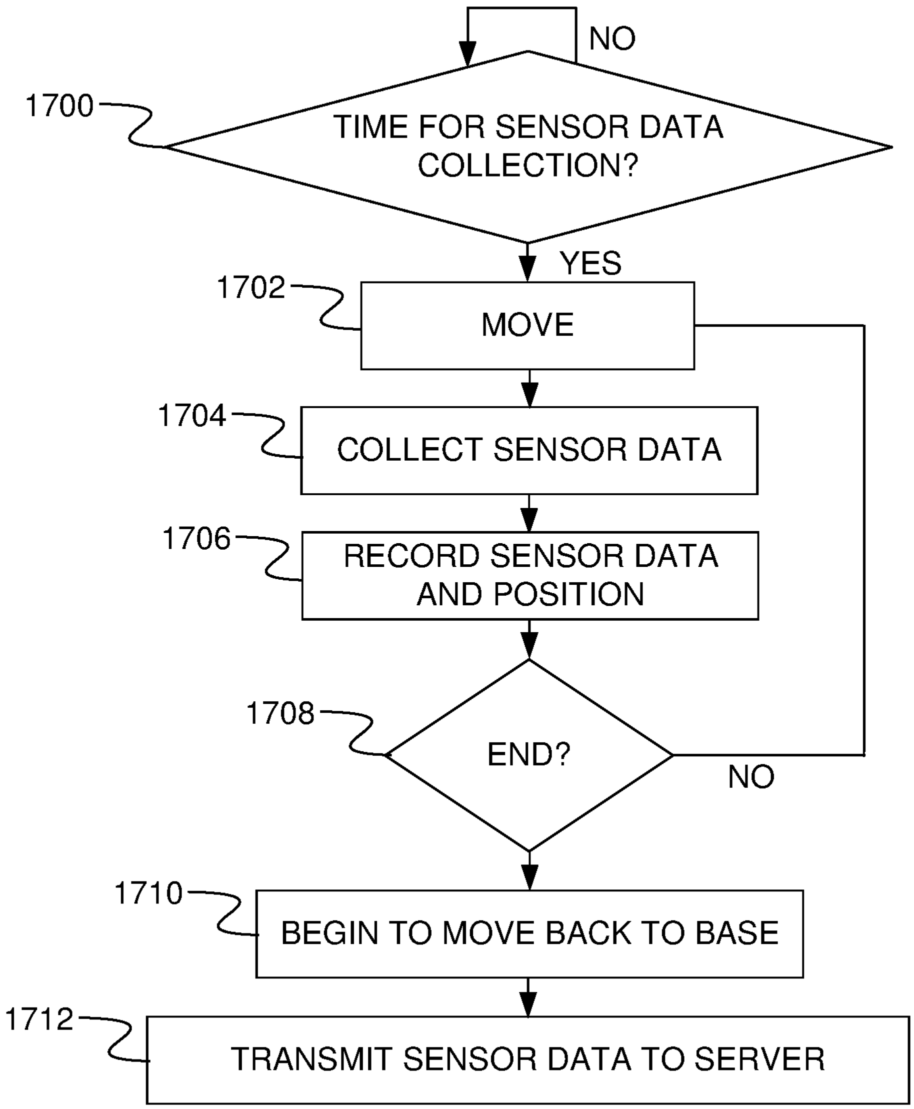
FIG. 17 is a flow diagram of a method of collecting data.

FIG. 17 provides a flow diagram of a method performed when executing sensor collection routine 1614. At step 1700, processor 1606 determines if it is time for sensor data collection. This can be determined from schedule 1612, which indicates times when data collection is to take place, and clock 1618, which indicates the current date and time. Additionally, or alternatively, processor 1606 can determine that it is time for sensor data collection based on an external command received through wireless interface 1652 that requests that sensor data be collected. The external command can be received from server 216 or from another device that is in wireless communication with processor 1606. If it is not time for data collection, processor 1606 waits for the scheduled time and/or for a command to be received while charging the battery if needed.

When the time for data collection arrives, processor 1606 instructs motor 800 to turn drive wheel 512 so as to place boom 360 at a desired position set in sensor collection routine 1614. When boom 360 arrives at the desired location, processor 1606 collects sensor data from range finder 1308, temperature sensor 1406, humidity sensor 1404, upward facing light sensors 1000, 1100, 1200, upward facing deep ultraviolet sensor 1202, downward facing light sensor 1300, downward facing infrared sensor 1310, downward facing deep ultraviolet sensor 1302, and $CO_2$ sensor 1402.

At step 1706, processor 1606 stores the sensor data as sensor data 1622 in memory 1610 along with the position along the plant bed where the data was collected and the time and date at which the data was collected. At step 1708, processor 1606 determines if the sensing system has reached the end of the plant bed. If the sensing system has not reached the end of the plant bed, processor 1606 sends an instruction through motor interface 1608 to motor 800 to cause the motor to rotate the drive wheel so that the sensing system moves laterally along the rail. Steps 1704, 1706, and 1708 are then repeated at the new position along the rail.

When the sensing system reaches the end of the plant bed, processor 1606 sends an instruction to motor 800 to return the sensing system to a docking station at step 1710. While motor 800 is turning drive wheel 512 to cause sensing system 350 to return to the docking station, processor 1606 transmits sensor data 1622 to server 216 through wireless interface 1652, router 1654, and internet 1656 at step 1712. Processor 1606 then waits until it is once again time for sensor data to be collected. In accordance with one embodiment, sensor data is collected once per hour over the entire length of the plant bed. In accordance with one embodiment, sensor data 1622 includes reflected light intensities measured by downward facing light sensor 1300 in spectral bands in the infrared region and the positions at which those light intensities were measured. In addition, the sensor data returned to server 218 includes an identifier for either sensing system 350 or the plant bed that sensing system 350 is positioned over so that server 218 has a complete indication of the position of sensor 1300 when the light intensities were measured.

In the embodiments shown in FIGS. 5-17, the plants in the plant beds are cannabis plants. These cannabis plants can include a single variety of cannabis or a plurality of different varieties of cannabis plants.

Although the system above discusses NPK-deficiency, the system can also be used to detect overwatering and underwatering of plants.

Although the sensing system shown in FIGS. 5-17 moves along a rail, in other embodiments, the sensing system is part of an unmanned aerial vehicle (UAV) that flies over the plant beds. In such UAV embodiments, the UAV flies within a meter of the top of the cannabis plants. Such UAV embodiments can be used with indoor grow operations or with outdoor farms. In such UAV embodiments, the positioning system is a global positioning system and the light sensor operates in the same way as discussed above for light sensor 1300. The UAV also include a processor, like processor 1606, and a wireless interface, like wireless interface 1602, that permits the UAV to transmit light intensities and positions to server 216.

Figure 18:
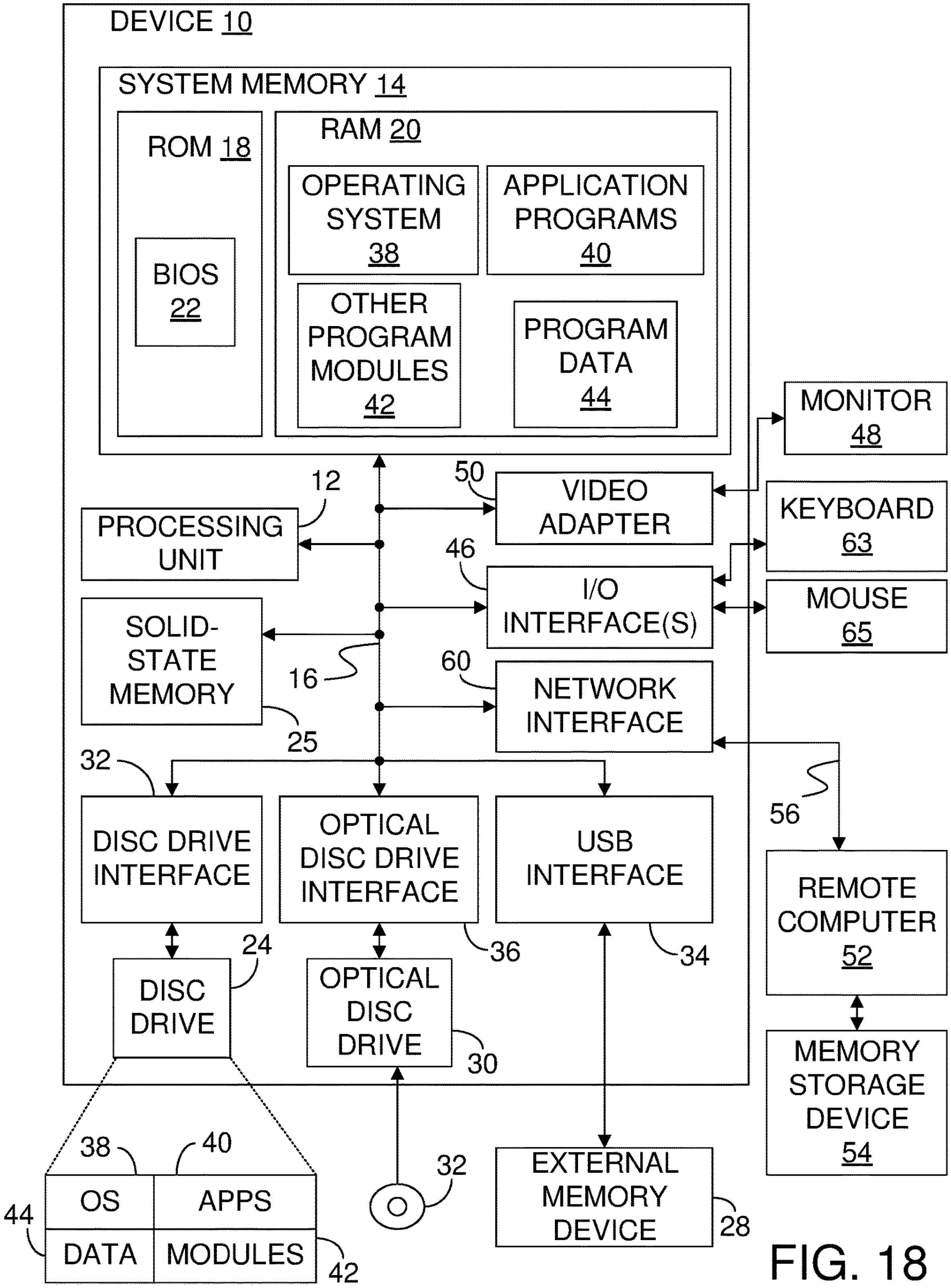
FIG. 18 is a block diagram of an exemplary server.

FIG. 18 provides an example of a computing device 10 that can be used to as any of the servers described above. Computing device 10 includes a processing unit 12, a system memory 14 and a system bus 16 that couples the system memory 14 to the processing unit 12. System memory 14 includes read only memory (ROM) 18 and random-access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 18. The network connections depicted in FIG. 18 include a local area network (LAN) or wide area network (WAN) 56. Such network environments are commonplace in the art. The computing device 10 is connected to the network through a network interface 60.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 18 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method of identifying NPK deficiency comprising:

measuring intensities of light reflected from a living *cannabis* plant to produce intensities at a set of spectral bands in the near infrared range, wherein the living *cannabis* plant is one variety of a plurality of varieties of *cannabis;* applying the intensities to a classifier so that the classifier provides one of an indication that the living *cannabis* plant is NPK-deficient or an indication that the living *cannabis* plant is NPK-sufficient, wherein the classifier has been trained using reflected light intensities in the near infrared range from plants that include each of the plurality of varieties of *cannabis;* determining a nutrient application value based on the indication that the living *cannabis* plant is NPK-deficient; and using the nutrient application value to apply nutrients to the living *cannabis* plant.

2. The method of claim 1 wherein the set of spectral bands is selected before measuring the intensities and is independent of the variety of the *cannabis* plant.

3. The method of claim 1 wherein measuring the intensities of reflected light comprises placing a light sensor within a meter of a top of the *cannabis* plant.

4. The method of claim 1 wherein the step of measuring includes measuring an intensity of light reflected from the living *cannabis* plant at each of a spectral band centered at 725.57, 732.05, 992.83, 854.39, 792.9, and 712.62 nm.

5. The method of claim 1 wherein measuring the intensities of reflected light comprises measuring the intensities before there is any visible indication of a nutrient deficiency in the *cannabis* plant.

6. A system comprising:

a sensing system comprising a light sensor and a positioning system, wherein the light sensor measures intensities for light reflected from a living *cannabis* plant at a set of spectral bands in the near infrared range, wherein the living *cannabis* plant is one variety of a plurality of varieties of *cannabis*, and the positioning system provides a position of the sensing system when the light sensor measured the intensities; and a classifier, receiving the intensities and the position and providing a classification for the living *cannabis* plant at the position, wherein the classification indicates whether the living *cannabis* plant is NPK-deficient or NPK-sufficient and the classification is based on the received intensities, wherein the classifier has been trained using reflected light intensities in the near infrared range from plants that include each of the plurality of varieties of *cannabis:* a nutrient calculator to determine a nutrient application value based on the indication that the living *cannabis* plant is NPK-deficient, and a nutrient application system to apply nutrients to the living *cannabis* plant using the nutrient application value.

7. The system of claim 6 wherein the sensing system positions the light sensor within a meter of a top of the living *cannabis* plant.

8. The system of claim 6 wherein the classifier provides the classification before the living *cannabis* plant shows visible signs of NPK-deficiency.

9. The method of claim 1, wherein the nutrient application value is indicative of an amount of nutrients to be applied to the living *cannabis* plant and is based upon the NPK-deficient classification provided by the classifier and a date of planting of the living *cannabis* plant, and wherein the step of using the nutrient application value to apply nutrients to the living *cannabis* plant includes:

communicating the nutrient application value to a nutrient application system; and controlling the nutrient application system to provide an amount of nutrients to the living *cannabis* plant based upon the nutrient application value over a multi-day period.

* * * * *